United States Patent [19]

Sullivan et al.

[11] Patent Number: 5,409,974
[45] Date of Patent: Apr. 25, 1995

[54] GOLF BALL CONTAINING OPTICAL BRIGHTENER BLEND

[75] Inventors: Michael J. Sullivan, Chicopee; Mark L. Binette, Ludlow, both of Mass.

[73] Assignee: Lisco, Inc., Tampa, Fla.

[21] Appl. No.: 124,891

[22] Filed: Sep. 22, 1993

[51] Int. Cl.$^6$ .................. C08K 5/45; C08K 5/353; A63B 37/12
[52] U.S. Cl. .................... 524/84; 524/95; 524/908; 273/235 R; 273/DIG. 22
[58] Field of Search .................. 273/235 R, DIG. 22; 524/84, 95, 908

[56] References Cited

U.S. PATENT DOCUMENTS

| | | | |
|---|---|---|---|
| 2,015,165 | 9/1935 | Twiss et al. | 91/68 |
| 2,188,284 | 1/1940 | Merril | 273/62 |
| 2,188,285 | 1/1940 | Merrill | 273/62 |
| 2,261,760 | 11/1941 | Habgood et al. | 273/62 |
| 2,787,024 | 4/1957 | Smith | 18/59 |
| 2,939,710 | 6/1960 | Dosmann et al. | 273/235 |
| 2,997,302 | 8/1961 | Smith | 273/235 |
| 3,313,595 | 4/1967 | Jockers et al. | 23/117 |
| 3,384,612 | 5/1968 | Brandt et al. | 260/41 |
| 3,647,221 | 3/1972 | Holley | 273/235 |
| 4,165,877 | 8/1979 | Miller et al. | 273/218 |
| 4,679,794 | 7/1987 | Yamada et al. | 273/235 |
| 4,679,795 | 7/1987 | Melvin et al. | 273/235 |
| 4,725,078 | 2/1988 | Jenicki | 283/70 |
| 4,802,674 | 2/1989 | Kitaoh | 273/235 |
| 4,865,326 | 9/1989 | Isaac et al. | 273/235 |
| 4,869,993 | 9/1989 | Farahat et al. | 430/143 |
| 4,884,814 | 12/1989 | Sullivan | 273/235 |
| 4,911,451 | 3/1990 | Sullivan et al. | 273/235 |
| 4,965,240 | 10/1990 | Imoto | 8/471 |
| 5,000,458 | 3/1991 | Proudfit | 273/235 |
| 5,018,742 | 5/1991 | Isaac et al. | 273/235 |
| 5,150,906 | 9/1992 | Molitor et al. | 273/220 |
| 5,156,405 | 10/1992 | Kitaoh et al. | 273/235 |
| 5,306,760 | 4/1994 | Sullivan | 273/235 R |
| 5,312,857 | 5/1994 | Sullivan | 273/235 R |

OTHER PUBLICATIONS

Abstract of U.S. Patent No. 3,918,719—"Method of Playing Golf Under Conditions of Insufficient Light", Welch Medard, Nov. 11, 1975.
Official Gazette—abstract of U.S. Patent No. 5,000,459, "Golf Ball Cover", Sharon R. Isaac, Mar. 19, 1991, p. 1341.
Official Gazette—abstract of U.S. Patent No. 5,120,791, "Golf Ball Cover Compositions", Michael J. Sullivan, Jun. 9, 1992, p. 1140.
Official Gazette—abstract of U.S. Patent No. 4,798,386, "Golf Ball with Flourescent Cover", R. B. Berard, Jan. 17, 1989, p. 1329.
Brochure—"Polymer Additives and Specialty Monomers, Eastobrite OB-1 Optical Brightener," Eastman Chemical Co.
Brochure—"Fluorescent Whitening Agent for Plastics and Coatings Uvitex OB," Ciba-Geigy Corp. 1990.

*Primary Examiner*—Peter A. Szekely

[57] ABSTRACT

A golf ball with a visible outer layer containing a blend of about 0.01–0.05 parts by weight of a thiophene-type optical brightener and about 0.008–0.025 parts by weight of a second optical brightener selected from the group consisting of 2,2'-(1,2-ethenediyldi-4,1-phenylene)bisbenzoxazole and derivatives thereof, the parts by weight of optical brightener being based upon 100 parts by weight of the polymeric material. The blend provides for a degree of whiteness comparable to that of 0.1 parts by weight of a thiophene-type optical brightener used alone, and provides for better solubility than results from the use of higher concentrations of 2,2'-(1,2-ethenediyldi-4,1-phenylene)bisbenzoxazole alone.

18 Claims, No Drawings

GOLF BALL CONTAINING OPTICAL BRIGHTENER BLEND

FIELD OF THE INVENTION

This invention is directed to the use of optical brighteners to enhance the whiteness of the outer surface of a golf ball.

BACKGROUND OF THE INVENTION

Golf balls are of two types, these types being one-piece balls and multicomponent balls. A one-piece ball consists of a polymeric sphere into which is molded a plurality of dimples to aid the flight characteristic of the ball. A multicomponent ball consists of a wound or solid core which is covered with a separate and distinct cover. This invention is concerned primarily with the latter-mentioned multicomponent-type golf balls and a means for enhancing the color of the covers in question, however, the invention also can be used with the one-piece balls described above.

For decades, golf ball covers consisted principally of naturally occurring balata. In the last thirty years, synthetic polymeric materials and mixtures thereof have come into widespread use as golf ball covers. In their natural form, neither the natural balata nor synthetic polymeric materials are white in appearance. Thus, in order to impart a white color to the golf balls, a two-part whitening system originally was used. This system involved both the incorporation of a white pigment into the cover material, and the application of a layer of white paint on the outer surface of the cover.

The necessity for applying a layer of white paint to the surface of a golf ball cover was later eliminated by the incorporation of optical brighteners into one or more of the outer layers of the ball, including the cover, a primer layer applied to the cover, and a clear top coat applied as the outermost layer of the ball. The incorporation of optical brighteners into the cover of a golf ball is described in U.S. Pat. No. 4,679,795, the contents of which are incorporated herein by reference. U.S. Pat. No. 4,865,326 describes the use of optical brighteners in a "clear coat" placed on the outer surface of a golf ball. U.S. Pat. No. 5,000,458 describes the inclusion of optical brighteners in a primer coat of a golf ball, the primer being applied between the cover and clear coat to promote adhesion of the clear coat to the golf ball cover.

SUMMARY OF THE INVENTION

It has been found that the use of a particular blend of a thiophene-type optical brightener with 2,2'-(1,2-ethenediyldi-4,1-phenylene) bisbenzoxazole or one of its derivatives provides unexpected advantages as compared to the use of a thiophene-type optical brightener alone. More particularly, it has been found that the weatherability of a white golf ball cover can be improved, and the quantity of optical brightener which is required to obtain a certain degree of whiteness in a golf ball can be reduced, by the inclusion in the cover of a blend of about 0.01–0.05 parts by weight of a thiophene-type optical brightener, preferably a thiophene benzoxazole, and about 0.008–0.025 parts by weight of 2,2'-(1,2-ethenediyldi-4,1-phenylene)bisbenzoxazole or one of its derivatives, based on 100 parts by weight of a polymeric cover material.

When 2,2'-(1,2-ethenediyldi-4,1-phenylene)bisbenzoxazole, which is sold by Eastman Kodak under the trade name Eastobrite OB-1, is mixed with ionomeric cover stock and white pigment in a concentration of about 0.075 pph Eastobrite OB-1 based on 100 parts of the polymeric cover material, at a temperature on the order of about 220° F. or less, and the cover stock is molded around a golf ball core, the Eastobrite OB-1 does not fully dissolve in the ionomer and, as a result, the optical brightener tends to immediately bloom to the surface of the cover, imparting a yellow tint to the cover. Insolubility also has been found to be a problem when levels of about 0.03 pph Eastobrite OB-1 or more, based upon 100 parts of the polymeric cover material, are used at higher mixing temperatures. While blooming may not occur immediately when the higher mixing temperatures are used, blooming has been observed after the golf ball cover has been exposed to high temperatures for an extended period of time, resulting in a reduction in the whiteness of the ball. The present invention overcomes the above-mentioned problems by providing an optical brightener blend which provides a golf ball with a high degree of whiteness per unit weight of brightener, and with improved weatherability.

An object of the invention is to provide an improved optical brightener for use in imparting whiteness to a golf ball.

Another object of the invention is to provide an optical brightener blend which can be used in lower quantities than conventional brighteners in order to achieve a predetermined degree of whiteness.

Another object of the invention is to provide a golf ball having a blend[of optical brighteners which does not have solubility problems when mixed with golf ball cover materials at relatively low mixing temperatures.

Yet another object of the invention is to provide a weather-resistant golf ball having a whiter-than-white appearance.

Yet another object of the invention is to provide a golf ball containing an optical brightener which imparts improved weatherability to the ball.

Other objects of the invention will become apparent from the specification and claims.

The invention in a preferred form is a golf ball having a layer with a visible outer surface, the layer being formed from a polymeric material, a white pigment and, a compatible optical brightener. The optical brightener consists essentially of a blend of about 0.01–0.05 parts by weight of a thiophene-type optical brightener, preferably a thiophene benzoxazole, and about 0.008–0.025 parts by weight of a second optical brightener selected from the group consisting of 2,2'-(1,2-ethenediyldi-4,1-phenylene)bisbenzoxazole and derivatives thereof, the parts by weight of optical brightener being based upon 100 parts by weight of the polymeric material. It has been found that particularly good results are obtained when the thiophene-type optical brightener is present in a concentration of about 0.01–0.03 parts by weight and the second optical brightener is present in a concentration of about 0.013–0.017 parts by weight. The white pigment preferably is present in an amount of about 1–10 parts by weight based upon 100 parts by weight of the polymeric material. Preferably, although not necessarily, the total quantity of optical brightener is sufficient to impart to the golf ball an initial whiteness of 160 or more on the ASTM E313-73 whiteness index scale.

In a particularly preferred embodiment, the second optical brightener is 2,2'-(1,2-ethenediyldi-4,1phenylene)bisbenzoxazole. The particularly preferred thiophene-type optical brightener is 2,2'-(2,5-thiophenediyl)bis[5-(1,1-dimethylethyl)benzoxazole].

The golf ball of the invention preferably is a 2-piece or multi-piece ball having a cover layer containing the optical brightener. The cover layer preferably is formed from a polymeric material which includes at least one member of the group consisting of polyurethane resins, polyolefin resins and ionic copolymers which are metal salts of the reaction product of an olefin having 2 to 8 carbon atoms and an unsaturated monocarboxylic acid having 3 to 8 carbon atoms. Commonly used white pigments include titanium dioxide, zinc oxide, zinc sulfide, barium sulfate, lithopone, and white lead.

Another preferred form of the invention is a polymeric cover material masterbatch which contains polymeric cover material, pigment, and an optical brightener, and is to be subsequently mixed with additional cover material which does not contain an optical brightener. The masterbatch and additional cover material are mixed in amounts of X wt % masterbatch and (100-X) wt additional cover material in order to obtain golf ball cover stock. The masterbatch contains an optical brightener consisting essentially of a blend of about $1/X–5/X$ wt % of a thiophene-type optical brightener and about $0.8/X–2.5/X$ wt % of a second optical brightener selected from the group consisting of a 2,2'-(1,2-ethenediyldi-4,1-phenylene)bisbenzoxazole and derivatives thereof, the wt % of optical brightener being based upon the total weight of the masterbatch. Preferably, the final cover material which is made from the masterbatch contains at least 90 wt % polymer.

Yet another preferred form of the invention is a method of making a golf ball. The method comprises the steps of obtaining a golf ball core and molding a cover layer around the core, the cover layer comprising a polymeric material, about 1–1.0 parts by weight of a white pigment and a compatible optical brightener consisting essentially of a blend of about 0.01–0.05 parts by weight of a thiophene-type optical brightener, preferably thiophene benzoxazole, and about 0.008–0.025 parts by weight of a second optical brightener selected from the group consisting of 2,2'-(1,2-ethenediyldi-4,1-phenylene)bisbenzoxazole and derivatives thereof, all weight percents being based upon the total weight of the polymeric material. In a particularly preferred embodiment, the optical brightener is mixed with a fraction of the polymeric material at a temperature of about 250° F. or less to form a masterbatch. Subsequently, the masterbatch is mixed with the remaining polymeric material, preferably at a ratio of about 1 part masterbatch per 9 parts of additional polymeric material.

The invention accordingly comprises the article possessing the features, properties, and relation of elements further described below, and the several steps and the relation of one or more such steps with respect to each of the others, as exemplified in the following detailed disclosure.

DETAILED DESCRIPTION OF THE INVENTION

The present invention enables a smaller overall quantity of optical brightener to be used to achieve nearly the same degree of whiteness as can be achieved using Uvitex OB alone. Furthermore, as indicated above, the preferred blend provides for improved solubility over the use of Eastobrite OB-1 alone. Preferably, the blend is added to golf ball cover material. However, it is also believed that it may be beneficial to use a blend of Eastobrite OB-1 and Uvitex OB in a ratio of, e.g. about 0.8:1 in primer coats and/or final clear coats in place of pure Uvitex OB.

As indicated in U.S. Pat. No. 4,679,795, optical brighteners can be used in conjunction with a wide variety of golf ball cover materials, including thermoplastic and thermosetting resins. Preferred cover materials are those which include at least one member of the group consisting of polyurethane resins, polyolefin resins and ionic copolymers which are metal salts of the reaction product of an olefin having 2 to 8 carbon atoms and an unsaturated monocarboxylic acid having 3 to 8 carbon atoms. Particularly preferred polymeric materials for use in golf ball covers in accordance with this invention are ionic copolymers of ethylene and unsaturated monocarboxylic acid which are available under the names "Suryln ®" from E.I. DuPont de Nemours and Company of Wilmington, Del. and "Iotek ®" from Exxon Corporation.

Even when an optical brightener is used, a white pigment of the type described above is used in conjunction with the polymeric cover composition, and generally comprises about 1–10 parts by weight based on the total weight of the polymeric material. A more preferred range of white pigment is about 1–5 parts by weight, and an even more preferred range is 1–3 parts by weight.

Optical brighteners are materials which absorb the invisible ultra-violet portion of the daylight spectrum and convert this energy into the longer-wavelength visible portion of the spectrum. Known optical brighteners include stilbene derivatives, styryl derivatives of benzene and biphenyl, bisbenzazol-2-yl derivatives, including thiophene benzoxazole, coumarins, carbostyrils, naphthilimides, derivatives of dibenzothiophene-5-5-dioxide, pyrene derivatives, and pyridotriazoles. In accordance with this invention, a blend of two commercially available optical brighteners can be used, i.e. Uvitex OB, which is sold by Ciba-Geigy Corporation and is 2,2'-(2,5-thiophenediyl)bis[5-(1,1-dimethylethyl)-benzoxazole], and Eastobrite OB-1, which, as mentioned above, is 2,2'-(1,2-ethenediyldi-4,1-phenylene)-bisbenzoxazole. According to the invention, Uvitex OB is present in a concentration of 0.01–0.05 parts by weight based upon 100 parts by weight of the polymeric material, and more preferably about 0.01–0.03 parts by weight. The Eastobrite OB-1 is present in a concentration of 0.008–0.025 parts by weight based upon 100 parts by weight of the polymeric material, and more preferably is present in a concentration of about 0.013–0.017 parts by weight. Preferably, the combination of brighteners is sufficient to provide the golf ball with an initial whiteness index of 154 and more preferably an initial whiteness index of about 164 or more. The brighteners preferably are added to a cover which has about 99 to about 89.50 percent, or even more preferably about 99 to about 94.80 percent, of an ionic copolymer which is a sodium, zinc and/or lithium salt of the reaction product of an olefin having from 2 to 8 carbon atoms and an unsaturated monocarboxylic acid having from 3 to 8 carbon atoms.

It is expected that other thiophene-type optical brighteners also will be compatible with the polymeric material of the invention and with Eastobrite OB-1, and thus these other compatible thiophene-type optical brighteners also can be utilized. It is noted, however that not all types of optical brighteners are compatible with golf ball cover materials. Furthermore, the brightener must be stable at temperatures at which the cover is molded to the core by injection molding or compression molding. One having ordinary skill in the art can select a compatible thiophene-type optical brightener.

As acknowledged by the producer of Eastobrite OB-1, when high levels of Eastobrite OB-1 are used in conjunction with a polymer, the yellow color of the brightener begins to show. This was confirmed in that is has been found that when the Eastobrite OB-1 concentration exceeded about 0.025 wt %, little if any, improvement in whiteness resulted from the additional amount of Eastobrite OB-1. Furthermore, when the golf balls containing 0.03 wt or more Eastobrite OB-1 were exposed to accelerated aging conditions by placing the balls in a 125° F. vacuum oven, the Eastobrite OB-1 bloomed to the surface of the ball, resulting in a substantial loss in whiteness, and even giving the ball a greenish-white hue in some cases.

As mentioned above, one of the preferred methods for making golf ball cover stock is to mix a masterbatch in which whiteners, including, for example, $TiO_2$, optical brightener, and ultramarine blue, are added in high concentrations. The masterbatch is commonly stored in granulated form. When golf ball covers are to be molded, the granulated masterbatch is mixed with additional polymeric cover material which does not contain whiteners. The masterbatch and additional polymer are mixed in a ratio of, e.g., 1 part masterbatch for 9 parts of additional cover material, and the cover material is then injection molded or compression molded around golf ball cores. When this type of cover-forming procedure is used, the optical brightener is present in the masterbatch at a concentration of ten times the concentration of the brightener in the final cover. Thus, an additional consideration in determining final Eastobrite OB-1 concentrations is to ensure that the Eastobrite OB-1 is sufficiently soluble in the masterbatch to prevent blooming upon later use in a golf ball cover.

In accordance with the invention, it has been found that a granulated masterbatch containing, e.g., 0.15 wt % of Eastobrite OB-1 in a mixture with, e.g., 0.2 wt % Uvitex OB, based upon the total weight of the masterbatch, will produce a golf ball with good whiteness and weatherability when mixed with additional cover material at a rate of 1 part masterbatch per 9 parts additional material. Stated more generally, a masterbatch containing a blend of 1/X–5/X weight percent of a thiophene-type optical brightener and about 0.8/X–2.5/X weight percent of a second optical brightener, such as 2'2-(1,2-ethenediyldi-4,1-phenylene)bisbenzoxazole, wherein X is the percentage of masterbatch based on the total weight of the cover material, will result in a final cover having 0.01–0.05 weight percent of thiophene-type optical brightener and about 0.008–0.025 weight percent of the second optical brightener based upon the total weight of the cover material. At these low brightener concentrations, and in covers which contain at least about 90 wt % polymer, values of wt % and pph of brightener are nearly equivalent. As mentioned above, this type of ball will have good whiteness characteristics. This favorable result is unexpected in view of technical literature for Eastobrite OB-1, which indicates that in polyethylene terephthalate fibers, Eastobrite OB-1 levels of 350 ppm may exceed solubility limits.

Having generally described the invention, the following example is included for purpose of illustration so that the invention may be more readily understood. The example is in no way intended to limit the scope of the invention, unless otherwise specifically indicated.

EXAMPLE

Masterbatches A-G having the compositions shown on Table 1 were prepared in a twin roll mill which was operated at a temperature of about 180°–220° F. After mixing and cooling, the masterbatch material was granulated for use in final formulations 1–11, which included additional Iotek 8000 and Iotek 7030. The final formulations are shown on Table 2.

Finished golf balls were prepared by centrally positioning pre-formed polybutadiene golf ball cores in an injection molding cavity using retractable pins. Cover materials of the eleven different compositions were injection molded around golf ball cores at about 385° F. The molded balls were then tested.

The initial whiteness, yellowness, and reflectance of the golf balls was measured using a colorimeter. The balls were then placed in a vacuum oven at 125° F. and 27 inches of mercury for 30 days, in order to accelerate long term aging of the balls. Measurements of whiteness, yellowness and reflectance were taken after 7 days, and then again after the 30 day period had expired. The results are shown on Table 3. The whiteness index tests were conducted in accordance with ASTM E313-73. The yellowness index tests were conducted in accordance with ASTM D-1925-70. and reflectance was measured using ASTM E313-73.

As shown in Table 3, a golf ball cover containing a composition of 0.015 parts by weight Eastobrite OB-1 and 0.02 parts by weight Uvitex OB, i.e. a total of 0.036 parts by weight optical brightener, had original values of whiteness, yellowness and reflectance which were comparable to those of the control cover, which contained 0.1 parts by weight Uvitex OB. Furthermore, values of whiteness, yellowness and reflectance after one week and after 30 days in the vacuum oven were comparable for the blend of Example 2 and control Example 1. Thus, this blend can be substituted for 0.1 wt % Uvitex OB.

The blends of Eastobrite OB-1 and Uvitex OB of samples 2 and 3 resulted in a smaller loss in whiteness after 30 days in the vacuum oven than any of the samples 4–11, which used Eastobrite OB-1 alone. Thus, the blends of Eastobrite OB-1 and Uvitex OB had superior weatherability to the use of Eastobrite OB-1 alone.

It is noted that in samples 7 and 8, cover compositions containing 0.025 parts by weight Eastobrite OB-1 also were comparable in whiteness, yellowness and reflectance to the covers of the Examples 1 and 2. However, the brightener compositions of Example 7 and 8 are considered inferior due to the potential for blooming to occur, particularly based upon the use of higher concentrations of Eastobrite OB-1 which are required in a masterbatch.

As shown in Examples 9–11, insolubility of Eastobrite OB-1 results in substantial reductions in whiteness over time for covers having Eastobrite OB-1 concentrations of 0.03 parts by weight and higher.

TABLE 1

MASTERBATCH COMPOSITIONS

| Masterbatch | A | B | C | D | E | F | G |
|---|---|---|---|---|---|---|---|
| Iotek 7030 (g)[1] | 24,948 | 750 | 750 | 24,948 | 750 | 750 | 750 |
| Uvitex OB (g)[2] | 349.6 | — | — | — | — | — | — |
| Eastobrite OB1 (g)[3] | — | 1.0 | 2.0 | 87.4 | 3.0 | 4.0 | 5.0 |
| UM Blue (g)[4] | 79.9 | 2.4 | 2.4 | 79.9 | 2.4 | 2.4 | 2.4 |
| Santanox R (g)[5] | 12.5 | 0.376 | 0.376 | 12.5 | 0.376 | 0.376 | 0.376 |
| $TiO_2$ (g)[6] | 7915 | 237.5 | 237.5 | 7915 | 237.5 | 237.5 | 237.5 |
| Weight Percent Eastobrite OB1 | — | 0.1 | 0.2 | 0.265 | 0.3 | 0.4 | 0.5 |

TABLE 2

COMPOSITION OF FINAL FORMULATIONS

| | 1 | 2 | 3 | 4 | 5 | 6 | 7 | 8 | 9 | 10 | 11 |
|---|---|---|---|---|---|---|---|---|---|---|---|
| Masterbatch Type - Amount (parts by weight) | A-9.4 | A-38 C-153 | A-1.91 B-7.64 | B-9.55 | C-191 | C-9.55 | C-95.5 E-95.5 | D-9.4 | B-9.55 | F-9.55 | G-9.55 |
| Iotek 8000 (parts by weight) | 69.8 | 1411 | 69.8 | 70.56 | 1411 | 70.56 | 1411 | 69.8 | 70.56 | 70.56 | 70.56 |
| Iotek 7030 (parts by weight) | 19.8 | 398 | 19.8 | 19.89 | 398 | 19.89 | 398 | 19.8 | 19.89 | 19.89 | 19.89 |

[1] Exxon Corp.
[2] Ciba-Geigy Chemical Co.
[3] Eastman Chemical Co.
[4] Whitaker, Clark and Daniels
[5] Monsanto
[6] Unitane 0-110 (Kemira, Inc.)

TABLE 3

WHITENESS, YELLOWNESS AND REFLECTANCE OF GOLF BALL COVERS CONTAINING DIFFERENT OPTICAL BRIGHTENER COMPOSITIONS

| | 1 | 2 | 3 | 4 | 5 | 6 | 7 | 8 | 9 | 10 | 11 |
|---|---|---|---|---|---|---|---|---|---|---|---|
| Parts By Weight[1] | | | | | | | | | | | |
| Eastobrite OB1 | — | 0.016 | 0.008 | 0.010 | 0.020 | 0.020 | 0.025 | 0.026 | 0.030 | 0.039 | 0.049 |
| Uvitex OB | 0.100 | 0.020 | 0.021 | — | — | — | — | — | — | — | — |
| Original | | | | | | | | | | | |
| Whiteness | 166.59 | 164.63 | 155.35 | 149.45 | 163.85 | 162.76 | 167.59 | 168.94 | 169.13 | 171.42 | 171.77 |
| Yellowness | −29.59 | −28.67 | −25.82 | −23.89 | −28.52 | −28.36 | −29.58 | −30.28 | −30.31 | −31.19 | −31.35 |
| Reflectance | 85.47 | 85.58 | 85.25 | 85.03 | 85.25 | 84.98 | 85.51 | 85.02 | 85.18 | 85.09 | 85.11 |
| Vacuum Oven (125° F., 27" mercury, 1 week) | | | | | | | | | | | |
| Whiteness | 162.13 | 161.21 | 151.95 | 144.90 | 159.42 | 157.22 | 163.75 | 165.70 | 163.12 | 163.23 | 165.93 |
| Yellowness | −28.24 | −27.55 | −24.74 | −22.39 | −27.05 | −26.59 | −28.33 | −29.36 | −28.35 | −28.54 | −29.49 |
| Reflectance | 85.58 | 85.74 | 85.35 | 85.11 | 85.41 | 85.05 | 85.63 | 84.93 | 85.43 | 85.31 | 85.25 |
| Vacuum Oven (125° F., 27" mercury, 30 days) | | | | | | | | | | | |
| Whiteness | 163.27 | 161.51 | 151.91 | 145.23 | 158.38 | 157.10 | 162.48 | 162.42 | 160.08 | 155.27 | 151.40 |
| Yellowness | −28.99 | −27.91 | −25.07 | −22.90 | −27.10 | −26.92 | −28.32 | −28.81 | −27.95 | −26.67 | −26.14 |
| Reflectance | 84.81 | 85.30 | 84.66 | 84.41 | 84.86 | 84.49 | 85.08 | 84.16 | 84.68 | 84.50 | 83.09 |
| Overall change | | | | | | | | | | | |
| Whiteness | −3.32 | −3.12 | −3.44 | −4.22 | −5.47 | −5.66 | −5.11 | −6.52 | −9.05 | −16.15 | −20.37 |
| Yellowness | 0.60 | 0.76 | 0.75 | 0.99 | 1.42 | 1.44 | 1.26 | 1.47 | 2.42 | 4.52 | 5.21 |
| Reflectance | −0.66 | −0.28 | −0.59 | −0.62 | −0.39 | −0.49 | −0.43 | −0.86 | −0.50 | −0.59 | −2.02 |
| Overall Percent Lose in Whites | 2.0 | 1.9 | 2.2 | 2.8 | 3.3 | 3.5 | 3.0 | 3.9 | 5.4 | 9.4 | 11.9 |

[1] Based on 100 parts by weight of ionomer

What is claimed is:

1. A golf ball having a layer with a visible outer surface, the layer comprising a polymeric material, about 1–10 parts be weight of a white pigment and a compatible optical brightener consisting essentially of a blend of about 0.01–0.05 parts by weight of a thiophene benzoxazole optical brightener and about 0.008–0.025 parts by weight of a 2,2'-(1,2-ethenediyldi-4,1-phenylene)bisbenzoxazole, the layer having an initial whiteness of at least about 154 and exhibiting a degree of whiteness retention sufficient to result in a reduction in whiteness of less than 2.8% when subjected to accelerated aging conditions in a vacuum oven at about 125° F. and 27" mercury for about thirty days, the parts by weight of optical brightener being based upon 100 parts by weight of the polymeric material.

2. A golf ball according to claim 1, wherein the thiophene-type optical brightener comprises 2,2'-(2,5-thiophenediyl)bis[5-(1,1-dimethylethyl)benzoxazole].

3. A golf ball according to claim 1, wherein the 2,2'-(1,2-ethenediyldi-4,1-phenylene)bisbenzoxazole is present in an amount of about 0.013–0.017 parts by weight.

4. A golf ball according to claim 2, wherein the 2,2-(2,5-thiophenediyl)bis[5-(1,1-dimethylethyl)benzoxazole is present in an amount of about 0.01–0.0.3 parts by weight.

5. A golf ball according to claim 1, wherein the layer formed from a polymeric material contains an ionomer.

6. A golf ball according to claim 1, wherein the layer formed from a polymeric material includes at least one member selected from the group consisting of polyurethane resins, polyolefin resins and ionic copolymers which are metal salts of the reaction product of an olefin having 2 to 8 carbon atoms and an unsaturated monocarboxylic acid having 3 to 8 carbon atoms.

7. A golf ball according to claim 6, wherein the layer formed from a polymeric material further includes about 1–5 parts by weight white pigment based upon 100 parts by weight of polymeric material.

8. A golf ball according to claim 1, wherein the layer comprising a polymeric material includes about 99 to about 94.80 percent of an ionic copolymer comprising at least one member selected from the group consisting of sodium, zinc and lithium salts of the reaction product of an olefin having from 2 to 8 carbon atoms and an unsaturated monocarboxylic acid having from 3 to 8 carbon atoms.

9. A golf ball having a core surrounded by an ionomeric layer with a visible outer surface having an initial whiteness of about 154 or more, the ionomeric layer comprising a compatible optical brightener consisting essentially of a blend of about 0.01–0.05 parts by weight of a 2,2-(2,5-thiophenediyl)bis[5-(1,1-dimethylethyl)-benzoxazole] and 0.008–0.025 parts by weight of a 2,2'(1,2-ethenediyldi-4,1-phenylene)bisbenzoxazole, the total quantity of optical brightener being no more than about 0.036 parts by weight, the parts by weight of optical brightener being based upon 100 parts by weight of the ionomer.

10. An ionomeric masterbatch for use in forming a golf ball cover having at least 90 wt % ionomer containing a mixture of X wt % masterbatch which includes optical brightener, and (100-X) wt % additional ionomer which does not contain optical brightener, and having an initial whiteness of at least 154 and exhibiting a degree of whiteness retention sufficient to result in a reduction in whiteness of less than 2.8% when subjected to accelerated aging in a vacuum oven at 125° F. and 27" mercury for about thirty days, the masterbatch including 100 parts by weight of a polymeric material, and an optical brightener consisting essentially of a blend of about $1/X$–$5/X$ weight % of a thiophene benzoxazole optical brightener and about $0.8/X$–$2.5/X$ weight % of a 2,2'-(1,2-ethenediyldi-4,1-phenylene)bisbenzoxazole, the parts by weight of optical brightener being based upon the total weight of the ionomeric masterbatch.

11. A masterbatch according to claim 10, wherein the thiophene benzoxazole optical brightener comprises 2,2'-(2,5-thiophenediyl)bis[5-(1,1-dimethylethyl)benzoxazole].

12. A masterbatch according to claim 10, wherein the 2,2'-(1,2-ethenediyldi-4,1-phenylene)bisbenzoxazole is present in an amount of about $1.3/X$–$1.7/X$ weight %.

13. A masterbatch according to claim 10, wherein the 2,2-(2-5-thiophenediyl)bis[5-(1,1-dimethylethyl)benzoxazole is present in an amount of about $1/X$–$3/X$ weight %.

14. A masterbatch according to claim 10, wherein the polymeric material includes at least one member of the group consisting of polyurethane resins, polyolefin resins and ionic copolymers which are metal salts of the reaction product of an olefin having 2 to 8 carbon atoms and an unsaturated monocarboxylic acid having 3 to 8 carbon atoms.

15. A method of making a golf ball comprising:
obtaining a golf ball core, and
molding a cover layer around the core, the cover layer comprising a polymeric material, 1–10 parts by weight white pigment, and a compatible optical brightener consisting essentially of a blend of about 0.01–0.05 parts by weight of a thiophene benzoxazole optical brightener and about 0.008–0.025 parts by weight of a 2,2'-(1,2-ethenediyldi-4,1-phenylene)bisbenzoxazole, the optical brightener blend imparting to the cover an initial whiteness of at least about 154 and a degree of whiteness retention sufficient to result in a reduction in whiteness of less than 2.8% when the cover is subjected to accelerated aging conditions in a vacuum oven at about 125° F. and 27" mercury for about thirty days, the parts by weight of optical brightener and white pigment being based upon 100 parts by weight of the polymeric material.

16. A method according to claim 15, further comprising the step of mixing the optical brightener with a fraction of the polymeric material at a temperature of about 250° F. or less to form a masterbatch prior to molding.

17. A method according to claim 16, further comprising the step of mixing the masterbatch with additional polymeric material.

18. A golf ball according to claim 1, wherein the optical brightener blend is present in the layer in an amount of no more than about 0.036 parts by weight.

* * * * *